United States Patent [19]

Cooper

[11] 4,247,078

[45] Jan. 27, 1981

[54] OVERRANGE VALVE OR THE LIKE

[75] Inventor: William J. Cooper, Los Angeles, Calif.

[73] Assignee: International Telephone and Telegraph Corporation, New York, N.Y.

[21] Appl. No.: 63,179

[22] Filed: Aug. 3, 1979

[51] Int. Cl.³ .......................... F16K 25/00; F01B 19/00
[52] U.S. Cl. ........................................... 251/86; 92/38; 251/DIG. 1
[58] Field of Search ............... 251/85, 86, 357, 358, 251/157, DIG. 1, 282, 356

[56] References Cited

U.S. PATENT DOCUMENTS

| 2,664,749 | 1/1954 | Jones | 92/10 |
| 2,920,653 | 1/1960 | Wolff | 251/357 |
| 3,009,678 | 11/1961 | Soderberg et al. | 251/85 |
| 3,557,837 | 1/1971 | Giwosky | 251/85 |
| 3,820,755 | 6/1974 | Greenwood et al. | 251/86 |
| 3,873,063 | 3/1975 | Illing | 251/282 |

FOREIGN PATENT DOCUMENTS

| 842228 | 7/1960 | United Kingdom | 251/DIG. 1 |
| 1539881 | 2/1979 | United Kingdom | 251/358 |

Primary Examiner—Martin P. Schwadron
Assistant Examiner—A. Michael Chambers
Attorney, Agent, or Firm—A. Donald Stolzy

[57] ABSTRACT

A differential pressure unit having overrange valves loosely mounted on a valve stem connected between the ends of a respective pair of movable bellows ends. A pair of spiral range springs bias both valves toward open positions. The valves include annular elastomers bonded to the edges of the apertured discs. The apertures in the discs act to allow the elastomers to seat and to unseat without causing lock-up. The discs are retained between plates and snap rings.

1 Claim, 5 Drawing Figures

OVERRANGE VALVE OR THE LIKE

BACKGROUND OF THE INVENTION

This invention relates to valves, and more particularly to overrange valves or the like to protect structures from excessive pressures.

PRIOR ART STATEMENT

Overrange valves are employed in conventional differential pressure units. Examples of the same are disclosed in the following:

Copending application Ser. No. 965,295 filed Nov. 30, 1978, by W. J. Cooper for METHOD OF AND APPARATUS FOR MAKING A BELLOWS assigned to the assignee of the instant application;

Jones U.S. Pat. No. 2,664,749 issued Jan. 5, 1954;

Greenwood et al. U.S. Pat. No. 3,820,755 issued June 28, 1974.

None of the said Cooper, Jones and Greenwood et al. disclosures have the best construction to prevent overrange valves from sticking or, locking closed. However, Greenwood et al. discloses a tiltable poppet valve.

SUMMARY OF THE INVENTION

In accordance with the valve of the present invention, the above-described and other disadvantages of the prior art are overcome by providing a seal carrying disc slidable and/or tiltable on a stem.

A feature of the invention resides in the use of a vented seal to prevent lock-up.

BRIEF DESCRIPTION OF THE DRAWINGS

In the accompanying drawings which illustrate exemplary embodiments of the present invention.

DESCRIPTION OF THE PREFERRED EMBODIMENT

Figure 1:
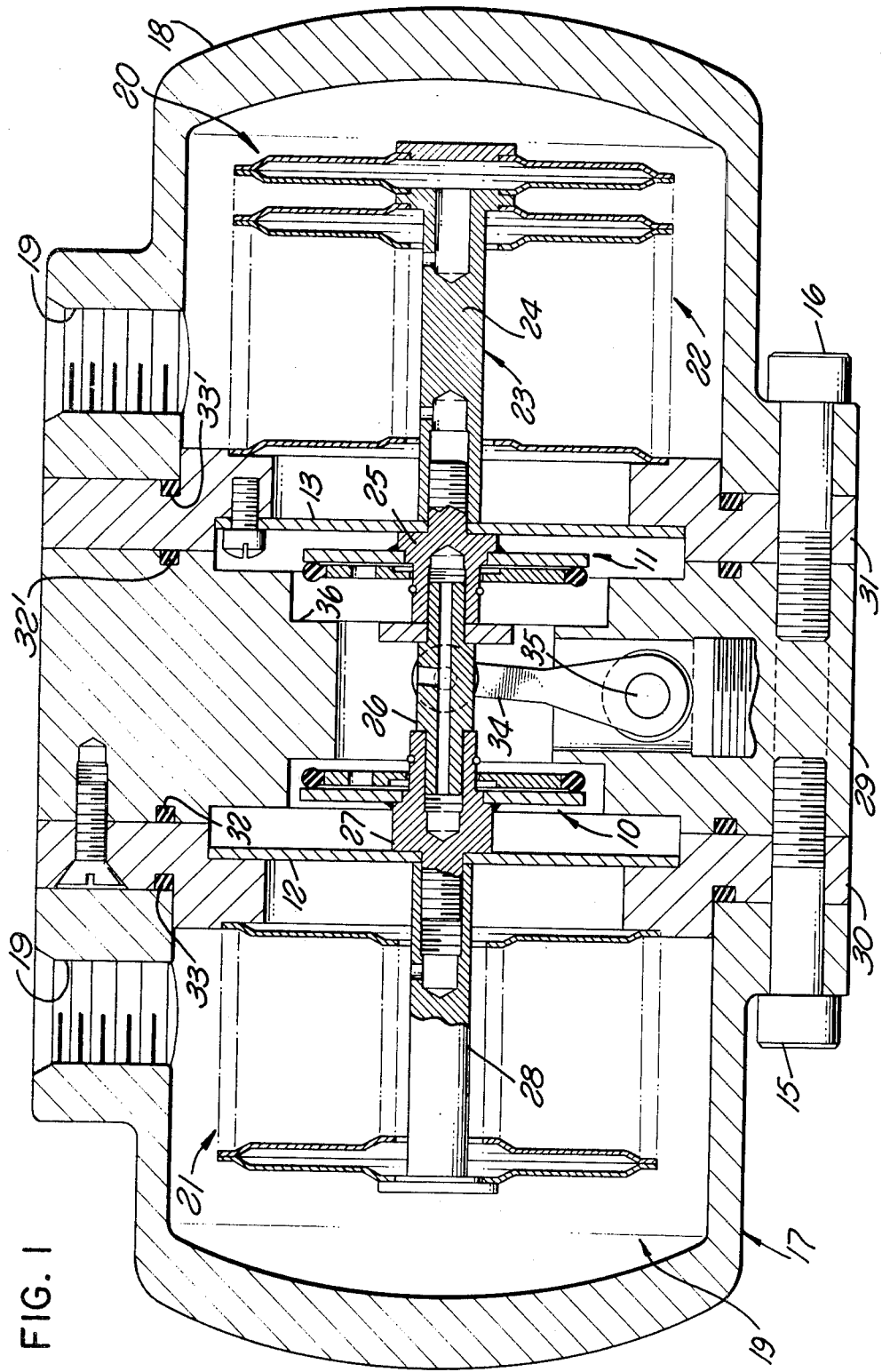
FIG. 1 is a longitudinal sectional view of a differential pressure unit (DPU) constructed in accordance with the present invention.
Figure 5:
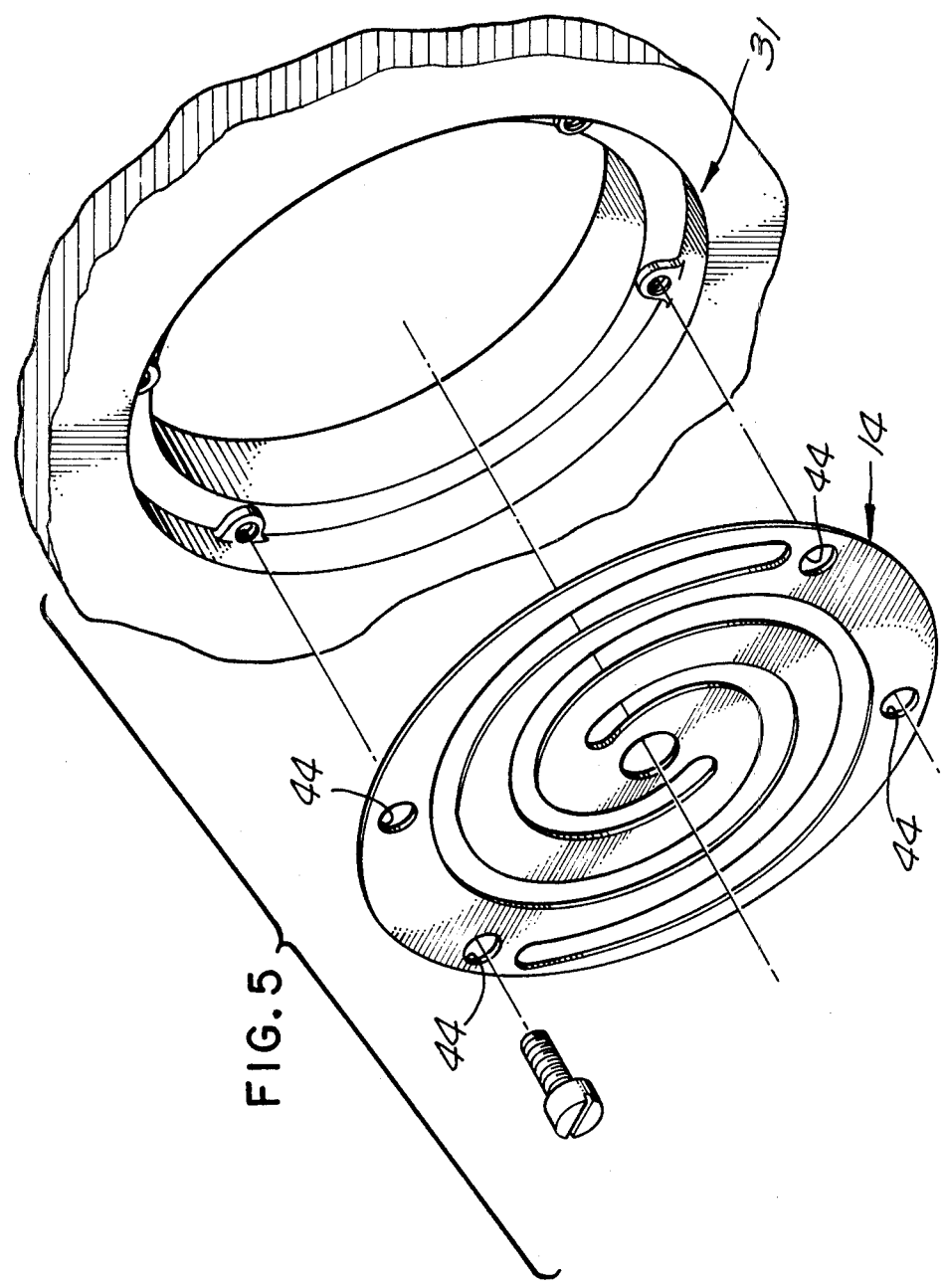
FIG. 5 is a broken away, exploded perspective view illustrating the manner in which spiral springs are mounted in FIG. 1.

The DPU shown in FIG. 1 may be conventional except for arrangements 10 and 11 providing overrange valves, and spiral springs 12 and 13 which may be identical to each other and to spiral spring 14 shown in FIG. 5.

The DPU assembly is held together by cap screws 15 and 16, the outer portions of the DPU including hat-shaped sections 17 and 18. Hat-shaped sections 17 and 18 have two openings thereinto, only one of which is shown at 19 in FIG. 1. See also the said Jones patent.

Sections 17 and 18 provide chambers 19 and 20 in which bellows 21 and 22 are mounted.

A stem 23 extends through most of the interior of the DPU, and all parts thereto are substantially fixed relative to each other. Part 24 is fixed relative to the right end of bellows 22, and is threaded to part 25. A central part 26 is threaded inside parts 27 and 25. Part 27 is threaded inside part 28.

The DPU has a central portion 29 sealed to portions 30 and 31 to which sections 17 and 18 are sealed respectively.

Seals are indicated at 32, 32', 33, and 33'. An arm 34 rotates a torque tube 35 responsive to reciprocation of stem 23, the operation of which and construction of which may be identical to those shown in the said Jones patent.

Figure 2:
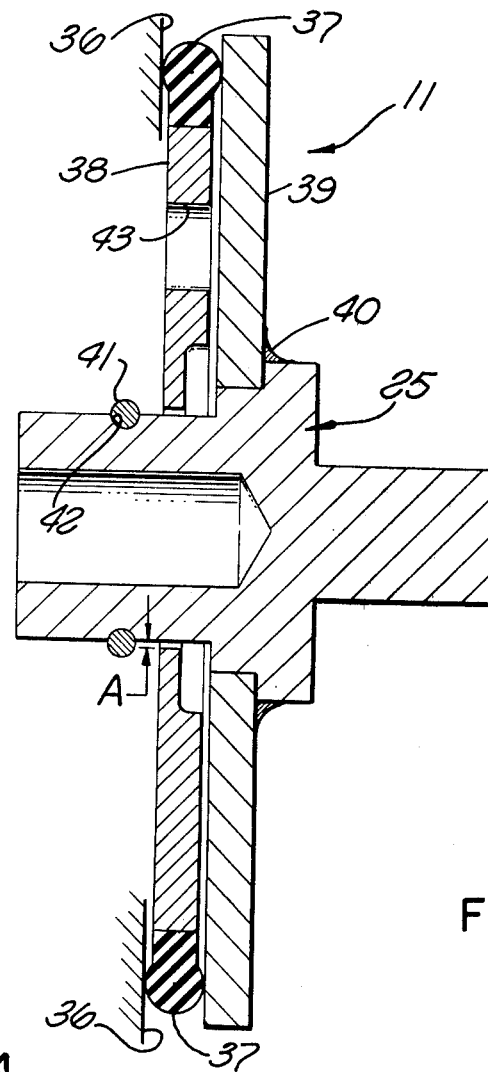
FIG. 2 is an enlarged longitudinal sectional view of a portion of the DPU shown in FIG. 1.

Due to the fact that arrangement 10 is essentially the same as an arrangement 11, although arrangements 10 and 11 are reversed, only arrangement 11 will be described in greater detail. An enlarged view of arrangement 11 is shown in FIG. 2. An elastomer such as rubber at 37 is bonded to a disc 38. Elastomer 37 is pressed against a fixed surface 36 (see both FIGS. 1 and 2) by a plate 39 welded or sealed at 40 to part 25.

Note will be taken that surface 36 lies in a plane substantially transverse to the longitudinal axis of the DPU in FIG. 1 and is annular.

As shown in FIG. 2, a snap ring 41 is substantially fixed in a groove 42 in part 25. When elastomer 37 is spaced from surface 36 as in FIG. 1, note will be taken that disc 38 can move in a radial or in an axial direction or can tilt. This makes it possible for a good seal to be provided by elastomer 37 between surface 36 and the right hand surface of plate 39.

In FIG. 2, note that space is provided at A so that the fit of disc 38 is somewhat loose.

Figure 3:
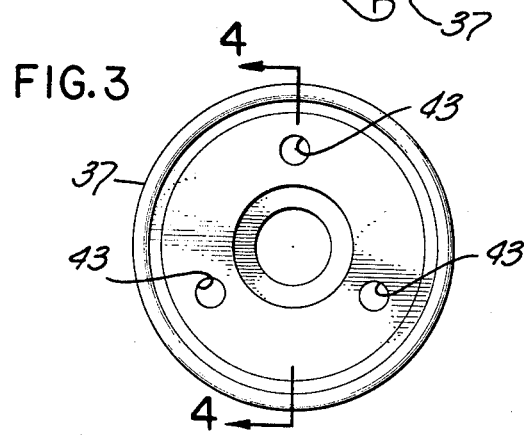
FIG. 3 is a front elevational view of parts shown in FIGS. 1 and 2.
Figure 4:
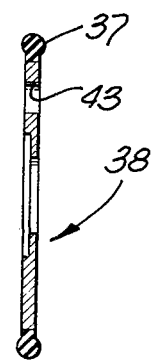
FIG. 4 is a verticle sectional view of the parts taken on the line 4—4 shown in FIG. 3.

Disc 38 and elastomer 37 are shown again in FIGS. 3 and 4 to a scale substantially the same as that to which they have been shown in FIG. 1.

In FIG. 3, note that disc 38 has 3 holes 43 extending completely therethrough. As shown in FIG. 2, holes 43 permit the escape and ingress of an incompressible liquid respectively from and to the space between disc 38 and plate 39. Note will be taken that without holes 43, if the said spaces are sealed, stem 23 may stick with the valve of one of the arrangements 10 or 11 closed.

Spring 14 shown in FIG. 5 may be entirely conventional, if desired. Screw holes are indicated at 44. Spring 13 would fit in DPU portion 31 in the same manner that spring 14 would and as shown in FIG. 5. Spring 12 would be similarly mounted in DPU portion 30.

What is claimed is:

1. Apparatus to shut off fluid flow, said apparatus comprising: an annular plate, an annular valve seat axially spaced from but otherwise concentric with said annular plate; a hub fixed centrally to said plate; means to guide axial movement of said hub concentrically with said valve seat; a rigid disc having an annular periphery and an aperture extending centrally therethrough, said hub extending loosely through said aperture; and an O-ring larger in diameter at its cross section than the thickness of said disc, said valve seat having a relatively flat surface for said O-ring diameter, said O-ring being mounting on the annular periphery of said disc between said valve seat and said annular plate to provide a fluid tight seal between said valve seat and said annular plate when said plate is moved toward said valve seat, said disc having a plurality of holes therethrough to prevent entrapment of fluid between said annular plate and said disc when said seal between said valve seat and said annular plate is effected, a snap ring being mounted on said hub and spaced from said annular plate to allow axial movement of said disc over said hub a limited distance from said annular plate, said O-ring being bonded to said disc.

* * * * *